United States Patent
Breit et al.

(10) Patent No.: US 8,923,219 B2
(45) Date of Patent: Dec. 30, 2014

(54) METHOD AND APPARATUS FOR SUPPORTING ADAPTIVE CHANNEL STATE INFORMATION FEEDBACK RATE IN MULTI-USER COMMUNICATION SYSTEMS

(75) Inventors: Gregory A. Breit, San Diego, CA (US); Santosh Paul Abraham, San Diego, CA (US); Sameer Vermani, San Diego, CA (US); Hemanth Sampath, San Diego, CA (US); Vincent Knowles Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 978 days.

(21) Appl. No.: 12/958,959

(22) Filed: Dec. 2, 2010

(65) Prior Publication Data

US 2011/0299480 A1 Dec. 8, 2011

Related U.S. Application Data

(60) Provisional application No. 61/305,394, filed on Feb. 17, 2010.

(51) Int. Cl.
*H04W 4/00* (2009.01)
*H04L 1/00* (2006.01)
*H04B 7/06* (2006.01)
*H04L 25/02* (2006.01)
*H04L 25/03* (2006.01)
*H04L 5/00* (2006.01)

(52) U.S. Cl.
CPC .......... *H04L 25/03343* (2013.01); *H04L 1/003* (2013.01); *H04L 25/0204* (2013.01); *H04L 1/0029* (2013.01); *H04B 7/0626* (2013.01); *H04L 2025/03777* (2013.01); *H04L 25/0222* (2013.01); *H04L 1/0026* (2013.01); *H04L 2025/03426* (2013.01); *H04L 5/0048* (2013.01); *H04B 7/0658* (2013.01); *H04L 25/0228* (2013.01)
USPC .......................................................... 370/329

(58) Field of Classification Search
None
See application file for complete search history.

(56) References Cited

U.S. PATENT DOCUMENTS

| 7,872,981 B2 | 1/2011 | Meylan et al. |
| 2004/0022213 A1 | 2/2004 | Choi et al. |
| 2005/0078707 A1* | 4/2005 | Maltsev et al. ............... 370/471 |

(Continued)

FOREIGN PATENT DOCUMENTS

| JP | 2005244991 A | 9/2005 |
| JP | 2006524969 A | 11/2006 |

(Continued)

OTHER PUBLICATIONS 802.11 Working Group: "IEEE 802.11N Part 11: Wireless LAN Medium Access Control (MAC) and Physical Layer (PHY) specifications: Enhancements for Higher Throughput" IEEE, Mar. 2006, XP002469313.

(Continued)

*Primary Examiner* — John Blanton
(74) *Attorney, Agent, or Firm* — Steven R. Thiel

(57) ABSTRACT

Certain aspects of the present disclosure relate to techniques for achieving adaptive channel state information (CSI) feedback rate in multi-user communication systems. A rate by which CSI feedback can be transmitted from each user station of a wireless system to a serving access point may be adjusted based on evolution of a channel between that user station and the access point.

32 Claims, 15 Drawing Sheets

(56) References Cited

U.S. PATENT DOCUMENTS

| | | | |
|---|---|---|---|
| 2005/0191965 A1 | 9/2005 | Yu et al. | |
| 2005/0289256 A1* | 12/2005 | Cudak et al. | 710/62 |
| 2006/0248429 A1 | 11/2006 | Grandhi et al. | |
| 2006/0256761 A1 | 11/2006 | Meylan et al. | |
| 2007/0189408 A1* | 8/2007 | Waxman | 375/267 |
| 2007/0298742 A1 | 12/2007 | Ketchum et al. | |
| 2008/0256411 A1* | 10/2008 | Whinnett et al. | 714/750 |
| 2008/0267302 A1* | 10/2008 | Cai et al. | 375/260 |
| 2009/0083542 A1 | 3/2009 | Craft et al. | |
| 2009/0201861 A1* | 8/2009 | Kotecha | 370/329 |
| 2009/0207765 A1 | 8/2009 | Yamaura | |
| 2009/0225697 A1* | 9/2009 | Solomon | 370/328 |
| 2010/0214992 A1 | 8/2010 | Hart et al. | |
| 2010/0254291 A1 | 10/2010 | Youn et al. | |
| 2010/0329128 A1* | 12/2010 | Kuchibhotla et al. | 370/252 |
| 2011/0128947 A1 | 6/2011 | Liu et al. | |
| 2011/0149882 A1* | 6/2011 | Gong et al. | 370/329 |
| 2011/0199946 A1 | 8/2011 | Breit et al. | |
| 2011/0199953 A1 | 8/2011 | Seok | |
| 2011/0242990 A1* | 10/2011 | Simonsson et al. | 370/242 |
| 2012/0176982 A1* | 7/2012 | Zirwas et al. | 370/329 |

FOREIGN PATENT DOCUMENTS

| | | |
|---|---|---|
| JP | 2007318728 A | 12/2007 |
| KR | 20080112236 A | 12/2008 |
| WO | 2004098072 A2 | 11/2004 |
| WO | 2007074453 A2 | 7/2007 |
| WO | WO-2007107943 A2 | 9/2007 |
| WO | 2008051466 A2 | 5/2008 |
| WO | WO-2008057999 A1 | 5/2008 |

OTHER PUBLICATIONS

Abraham S., et al., "802.11n MAC design and system performance", IEEE International Conference on Communications, vol. 5, May 16, 2005, pp. 2957-2961, XP010825769, Piscataway, NJ, USA, IEEE DOI: 10.1109/ICC.2005.1494932 ISBN: 978-0-7803-8938-0.

International Search Report and Written Opinion—PCT/US2011/025344, ISA/EPO—Jul. 1, 2011.

Lau V.K.N., "Proportional fair spatial scheduling for wireless access point with multiple antenna—reverse link with scalar feedback", Institute of Electrical and Electronics Engineers, IEEE Global Telecommunications Conference, Conference Proceedings, vol. 1, Nov. 17, 2002, pp. 763-767, XP010636053, New York, NY: IEEE, US DOI: 10.1109/GL0C0M.2002.1188181 ISBN: 978-0-7803-7632-8.

Love D.J., et al., "An overview of limited feedback in wireless communication systems", IEEE Journal on Selected Areas in Communications, IEEE Service Center, Piscataway, US, vol. 26, No. 8, Oct. 1, 2008, pp. 1341-1365, XP011236212, ISSN: 0733-8716, DOI: 10.1109/JSAC.2008.081002.

Mirkovic J., et al., "Channel Aware Scheduling in MU-DCF WLANs",Wireless Communications, Networking and Mobile Computing, 2007. WICOM 2007.International Conference on, IEEE, Piscataway, NJ, USA, Sep. 21, 2007, pp. 1184-1187, XP031261477, ISBN: 978-1-4244-1311-9.

Tang T., et al., "Opportunistic Feedback for Multiuser MIMO Systems With Linear Receivers", IEEE Transactions on Communications, IEEE Service Center, Piscataway, NJ. USA,vol. 55, No. 5, May 1, 2007,pp. 1020-1032, XP011181279, ISSN: 0090-6778, DOI: 10.1109/TCOMM.2007.896013.

Taiwan Search Report—TW100105282—TIPO—Oct. 25, 2013.

\* cited by examiner

METHOD AND APPARATUS FOR SUPPORTING ADAPTIVE CHANNEL STATE INFORMATION FEEDBACK RATE IN MULTI-USER COMMUNICATION SYSTEMS

CLAIM OF PRIORITY UNDER 35 U.S.C. §119

The present application for patent claims benefit of U.S. Provisional Patent Application Ser. No. 61/305,394, entitled, "MAC protocol to support adaptive channel state information feedback rate in multi-user communication systems", filed Feb. 17, 2010, and assigned to the assignee hereof and hereby expressly incorporated by reference herein.

CROSS REFERENCE TO RELATED APPLICATIONS

The present application for patent is related by subject matter to U.S. patent application Ser. No. 12/958,988, entitled, "Method and apparatus for supporting adaptive channel state information feedback rate in multi-user communication systems," filed herewith and assigned to the assignee hereof and hereby expressly incorporated by reference herein.

BACKGROUND

1. Field

Certain aspects of the present disclosure generally relate to wireless communications and, more particularly, to methods and apparatuses for supporting adaptive channel state information feedback rate in multi-user communication systems.

2. Background

In order to address the issue of increasing bandwidth requirements that are demanded for wireless communication systems, different schemes are being developed to allow multiple user terminals to communicate with a single access point (AP) by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single AP and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac standards. A receiver STA may be able to detect a transmission mode of the signal based on information included in a preamble of transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

Since a channel between the AP and a STA of the plurality STAs may vary with time due to a mobility of that STA or due to mode stirring caused by objects moving in the STA's environment, the CSI may need to be updated periodically in order for the AP to accurately beamform to that particular STA. A required rate of CSI feedback for each STA may depend on a coherence time of a channel between the AP and that STA. An insufficient feedback rate may adversely impact performance due to inaccurate beamforming. On the other hand, an excessive feedback rate may produce minimal additional benefit, while wasting valuable medium time.

In a scenario consisting of multiple spatially separated users, it is expected that the channel coherence time, and therefore the appropriate CSI feedback rate, varies spatially across the users. In addition, due to various factors, such as changing channel conditions and mobility of a user, the appropriate CSI feedback rate may also vary temporally for each of the users. For example, some STAs (such as high definition television (HDTV) or set-top box) may be stationary, whereas others (such as handheld devices) may be subject to motion. Furthermore, a subset of STAs may be subject to a high Doppler from fluorescent light effects. Finally, multi-paths to some STAs may have more Doppler than others since different scatterers may move at different velocities and affect different subsets of STAs.

Therefore, if a single rate of CSI feedback is utilized for all supported STAs in a wireless system, the system performance may suffer due to inaccurate beamforming for those STAs with insufficient feedback rates, and/or due to excessive feedback overhead for those STAs with unnecessarily high feedback rates.

In conventional schemes, the CSI feedback occurs at a rate consistent with the worst-case user in terms of mobility or temporal channel variation. For an SDMA system consisting of STAs experiencing a range of channel conditions, no single CSI feedback rate is appropriate for all STAs. Catering to the worst-case user will result in an unnecessary waste of channel resources by forcing STAs in relatively static channel conditions to feedback CSI at the same rate as those in a highly dynamic channel.

For example, in the case of Evolution-Data Optimized (EV-DO) Data-rate Control Channel (DRC), the "channel state" information reflects a received pilot signal-to-interference-plus-noise ratio (SINR) and is transmitted by a STA to facilitate rate selection for the next transmission. This information is updated at a fixed rate for all users, presumably at a rate sufficient to track channel variations associated with the worst-case expected mobility situations. This particular rate of channel state feedback may be unnecessarily high for static users. On the other hand, the DRC was designed to provide a minimal overhead. Because the CSI feedback in SDMA system is used to support complex beamforming at the AP, it may not be feasible to compress or streamline this feedback to a degree accomplished in the EV-DO design.

As another example, for the Institute of Electrical and Electronic Engineers (IEEE) 802.11n standard supporting transmit beamforming, the rate at which CSI is transmitted is not specified, and this is considered an implementation issue. In contrast, due to potentially high overhead of CSI feedback for multiple SDMA users in the IEEE 802.11ac standard, and due to potential abuse of such CSI feedback mechanism by rogue STAs, it may be desirable to specify protocols for CSI feedback in the standard specification.

SUMMARY

Certain aspects of the present disclosure provide a method for wireless communications. The method generally includes selecting a subset of apparatuses from a plurality of apparatuses, wherein the subset is selected based at least on a metric associated with each apparatus of the plurality of apparatuses, transmitting a request for channel state information (CSI) and a training sequence to each apparatus in the subset, receiving, from each apparatus in the subset, CSI associated with that apparatus, wherein the CSI is determined in response to the request for CSI using the training sequence, and transmitting data to the plurality of apparatuses based at least on the CSI received from each apparatus in the subset.

Certain aspects of the present disclosure provide an apparatus for wireless communications. The apparatus generally includes a first circuit configured to select a subset of apparatuses from a plurality of apparatuses, wherein the subset is selected based at least on a metric associated with each apparatus of the plurality of apparatuses, a transmitter configured to transmit a request for channel state information (CSI) and a training sequence to each apparatus in the subset, and a receiver configured to receive, from each apparatus in the subset, CSI associated with that apparatus, wherein the CSI is determined in response to the request for CSI using the training sequence, wherein the transmitter is also configured to transmit data to the plurality of apparatuses based at least on the CSI received from each apparatus in the subset.

Certain aspects of the present disclosure provide an apparatus for wireless communications. The apparatus generally includes means for selecting a subset of apparatuses from a plurality of apparatuses, wherein the subset is selected based at least on a metric associated with each apparatus of the plurality of apparatuses, means for transmitting a request for channel state information (CSI) and a training sequence to each apparatus in the subset, and means for receiving, from each apparatus in the subset, CSI associated with that apparatus, wherein the CSI is determined in response to the request for CSI using the training sequence, wherein the means for transmitting is further configured to transmit data to the plurality of apparatuses based at least on the CSI received from each apparatus in the subset.

Certain aspects of the present disclosure provide a computer-program product for wireless communications. The computer-program product includes a computer-readable medium comprising instructions executable to select a subset of apparatuses from a plurality of apparatuses, wherein the subset is selected based at least on a metric associated with each apparatus of the plurality of apparatuses, transmit a request for channel state information (CSI) and a training sequence to each apparatus in the subset, receive, from each apparatus in the subset, CSI associated with that apparatus, wherein the CSI is determined in response to the request for CSI using the training sequence, and transmit data to the plurality of apparatuses based at least on the CSI received from each apparatus in the subset.

Certain aspects of the present disclosure provide an access point. The access point generally includes at least one antenna, a first circuit configured to select a subset of wireless nodes from a plurality of wireless nodes, wherein the subset is selected based at least on a metric associated with each wireless node of the plurality of wireless nodes, a transmitter configured to transmit via the at least one antenna a request for channel state information (CSI) and a training sequence to each wireless node in the subset, and a receiver configured to receive, from each wireless node in the subset via the at least one antenna, CSI associated with that wireless node, wherein the CSI is determined in response to the request for CSI using the training sequence, wherein the transmitter is also configured to transmit data via the at least one antenna to the plurality of wireless nodes based at least on the CSI received from each wireless node in the subset.

Certain aspects of the present disclosure provide a method for wireless communications. The method generally includes receiving, from an apparatus, a request for channel state information (CSI) and a training sequence, determining, in response to the request, CSI using the training sequence, transmitting the CSI to the apparatus, and receiving data from the apparatus based at least on the CSI transmitted to the apparatus.

Certain aspects of the present disclosure provide an apparatus for wireless communications. The apparatus generally includes a receiver configured to receive, from another apparatus, a request for channel state information (CSI) and a training sequence, a first circuit configured to determine, in response to the request, CSI using the training sequence, and a transmitter configured to transmit the CSI to the other apparatus, wherein the receiver is also configured to receive data from the other apparatus based at least on the CSI transmitted to the other apparatus.

Certain aspects of the present disclosure provide an apparatus for wireless communications. The apparatus generally includes means for receiving, from another apparatus, a request for channel state information (CSI) and a training sequence, means for determining, in response to the request, CSI using the training sequence, and means for transmitting the CSI to the other apparatus, wherein the means for receiving is further configured to receive data from the other apparatus based at least on the CSI transmitted to the other apparatus.

Certain aspects of the present disclosure provide a computer-program product for wireless communications. The computer-program product includes a computer-readable medium comprising instructions executable to receive, from an apparatus, a request for channel state information (CSI) and a training sequence, determine, in response to the request, CSI using the training sequence, transmit the CSI to the apparatus, and receive data from the apparatus based at least on the CSI transmitted to the apparatus.

Certain aspects of the present disclosure provide an access terminal. The access terminal generally includes at least one antenna, a receiver configured to receive, from an access point via the at least one antenna, a request for channel state information (CSI) and a training sequence, a first circuit configured to determine, in response to the request, CSI using the training sequence, and a transmitter configured to transmit, via the at least one antenna, the CSI to the access point, wherein the receiver is also configured to receive, via the at least one antenna, data from the access point based at least on the CSI transmitted to the access point.

Certain aspects of the present disclosure provide a method for wireless communications. The method generally includes receiving one or more training sequences from one or more apparatuses, estimating one or more channels associated with the one or more apparatuses based on the one or more training sequences, and calculating a metric for each of the apparatuses based at least on a value associated with each of the estimated channels.

Certain aspects of the present disclosure provide an apparatus for wireless communications. The apparatus generally includes a receiver configured to receive one or more training sequences from one or more other apparatuses, an estimator configured to estimate one or more channels associated with the one or more other apparatuses based on the training sequences, and a first circuit configured to calculate a metric for each of the other apparatuses based at least on a value associated with each of the estimated channels.

Certain aspects of the present disclosure provide an apparatus for wireless communications. The apparatus generally includes means for receiving one or more training sequences from one or more other apparatuses, means for estimating one or more channels associated with the one or more other apparatuses based on the training sequences, and means for calculating a metric for each of the other apparatuses based at least on a value associated with each of the estimated channels.

Certain aspects of the present disclosure provide a computer-program product for wireless communications. The computer-program product includes a computer-readable medium comprising instructions executable to receive one or more training sequences from one or more apparatuses, estimate one or more channels associated with the one or more apparatuses based on the training sequences, and calculate a metric for each of the apparatuses based at least on a value associated with each of the estimated channels.

Certain aspects of the present disclosure provide an access point. The access point generally includes at least one antenna, a receiver configured to receive via the at least one antenna one or more training sequences from one or more wireless nodes, an estimator configured to estimate one or more channels associated with the one or more wireless nodes based on the training sequences, and a first circuit configured to calculate a metric for each of the wireless nodes based at least on a value associated with each of the estimated channels.

Certain aspects of the present disclosure provide a method for wireless communications. The method generally includes transmitting a training sequence to an apparatus, receiving, from the apparatus, a request for channel state information (CSI) and another training sequence, wherein the request is based at least on the training sequence, determining, in response to the request, CSI based on the other training sequence, transmitting the CSI to the apparatus, and receiving data from the apparatus, wherein the data were transmitted based at least on the CSI.

Certain aspects of the present disclosure provide an apparatus for wireless communications. The apparatus generally includes a transmitter configured to transmit a training sequence to another apparatus, a receiver configured to receive, from the other apparatus, a request for channel state information (CSI) and another training sequence, wherein the request is based at least on the training sequence, and a first circuit configured to determine, in response to the request, CSI based on the other training sequence, wherein the transmitter is also configured to transmit the CSI to the other apparatus, and the receiver is also configured to receive data from the other apparatus, wherein the data were transmitted based at least on the CSI.

Certain aspects of the present disclosure provide an apparatus for wireless communications. The apparatus generally includes means for transmitting a training sequence to another apparatus, means for receiving, from the other apparatus, a request for channel state information (CSI) and another training sequence, wherein the request is based at least on the training sequence, and means for determining, in response to the request, CSI based on the other training sequence, wherein the means for transmitting is further configured to transmit the CSI to the other apparatus, and the means for receiving is further configured to receive data from the other apparatus, wherein the data were transmitted based at least on the CSI.

Certain aspects of the present disclosure provide a computer-program product for wireless communications. The computer-program product includes a computer-readable medium comprising instructions executable to transmit a training sequence to an apparatus, receive, from the apparatus, a request for channel state information (CSI) and another training sequence, wherein the request is based at least on the training sequence, determine, in response to the request, CSI based on the other training sequence, transmit the CSI to the apparatus, and receive data from the apparatus, wherein the data were transmitted based at least on the CSI.

Certain aspects of the present disclosure provide an access terminal. The access terminal generally includes at least one antenna, a transmitter configured to transmit via the at least one antenna a training sequence to an access point, a receiver configured to receive, from the access point via the at least one antenna, a request for channel state information (CSI) and another training sequence, wherein the request is based at least on the training sequence, and a first circuit configured to determine, in response to the request, CSI based on the other training sequence, wherein the transmitter is also configured to transmit via the at least one antenna the CSI to the access point, and the receiver is also configured to receive data from the access point via the at least one antenna, wherein the data were transmitted based at least on the CSI.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
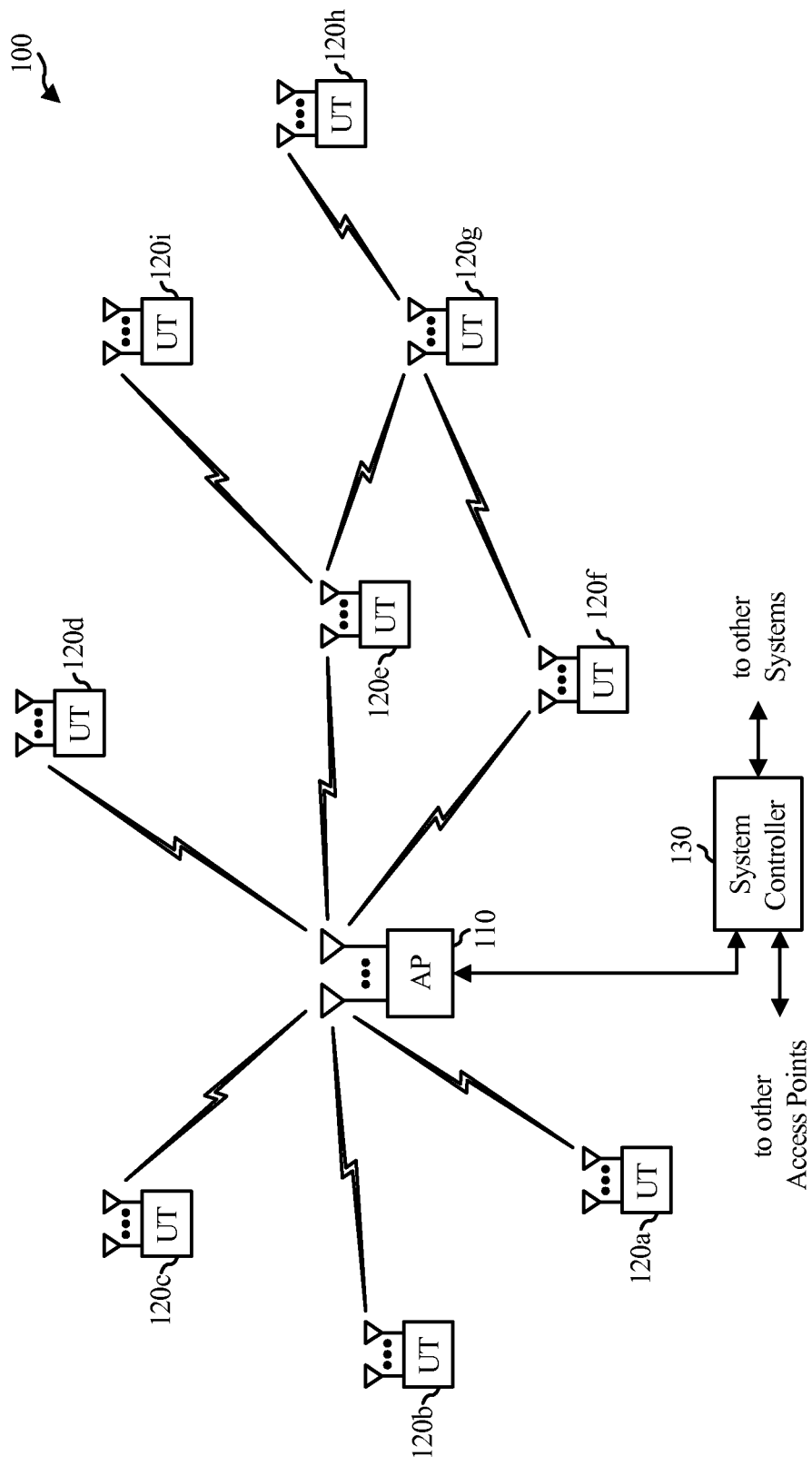
FIG. 1 illustrates a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be, for example, advantageous to systems employing Ultra Wide Band (UWB) signals including millimeter-wave signals. However, the present disclosure is not intended to be limited to such systems, as other coded signals may benefit from similar advantages.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile terminal, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). MIMO system 100 may represent a high speed Wireless Local Area Network (WLAN) operating in a 60 GHz band.

Figure 2:
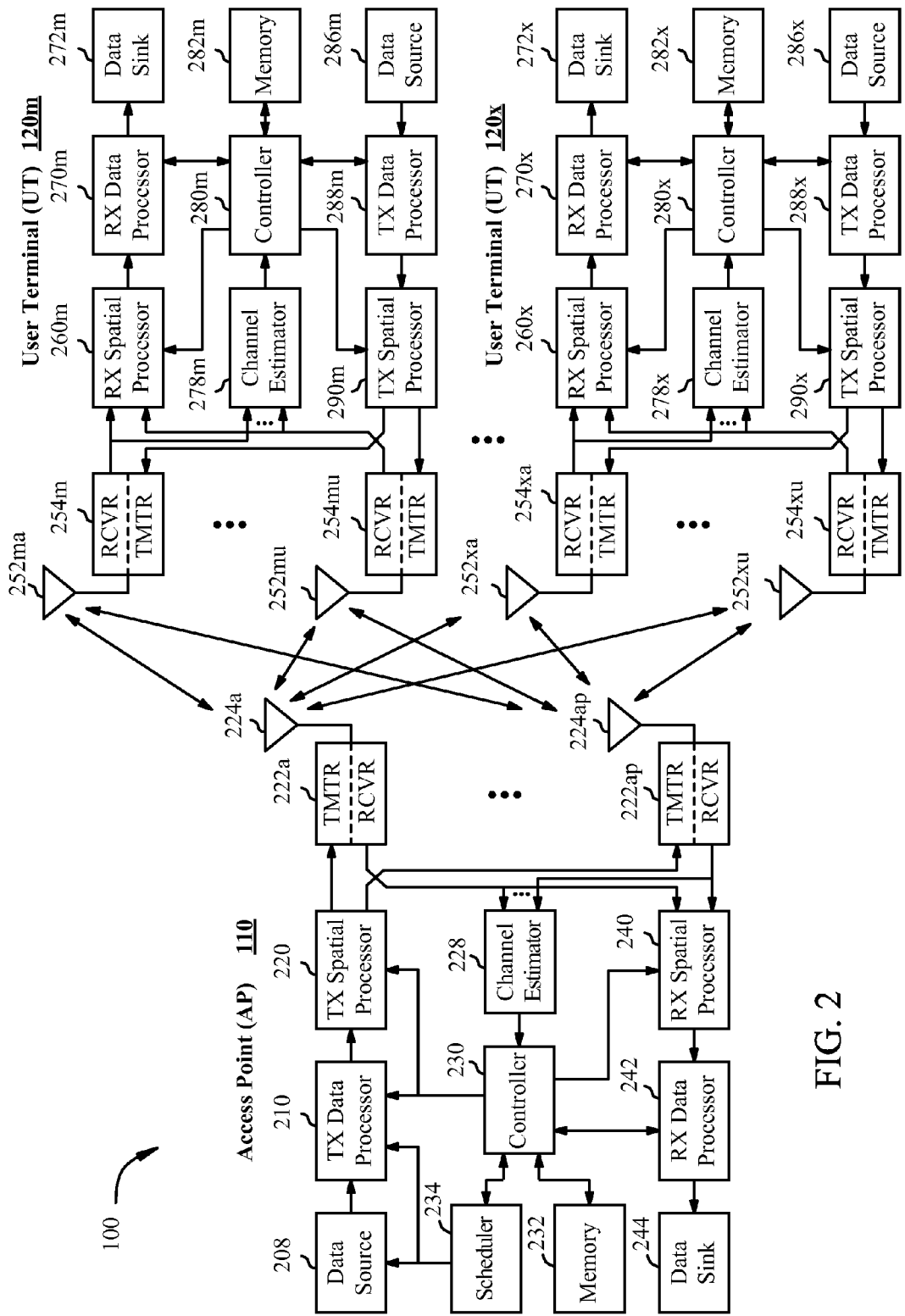
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$, antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$, antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$, received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$, user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$, received symbol streams from $N_{ut,m}$, receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$, antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$, receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
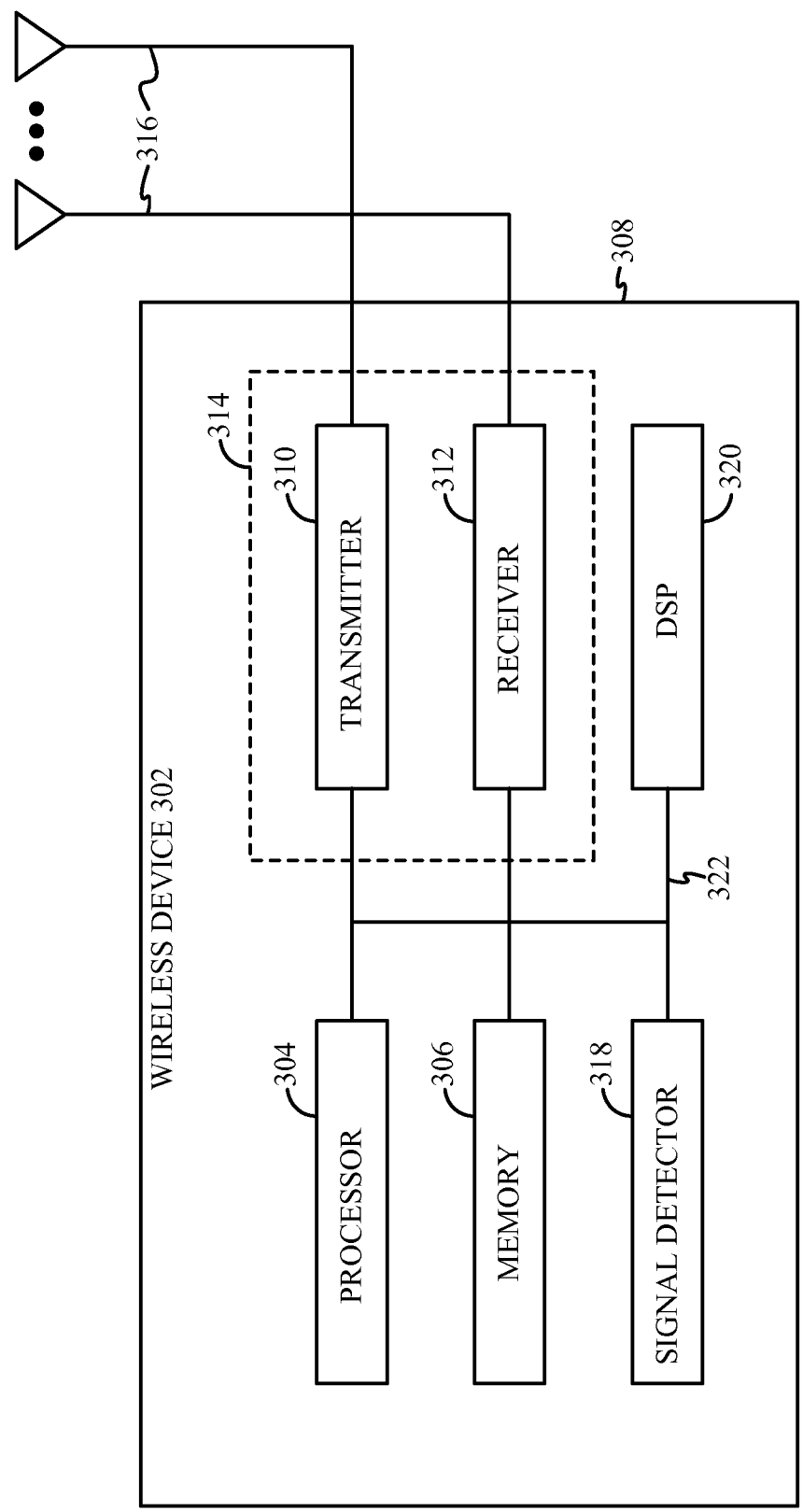
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support protocols for achieving adaptive channel state information (CSI) feedback rate in multi-user communication systems, such as the system 100 illustrated in FIG. 1. A rate by which CSI feedback may be transmitted to the AP 110 from each of the user terminals (stations) 120 may be adjusted based on evolution of a channel between that station and the AP.

An appropriate rate of CSI feedback for a particular station may depend on the signal-to-noise ratio (SNR) conditions of the station. For example, it may be desirable to bias lower-SNR users toward a lower CSI feedback rate because for low downlink modulation-coding scheme (MCS) levels, the throughput penalty due to precoding based on stale CSI may be less than that for high MCS/SNR users. In addition, the uplink resources required to communicate CSI may be greater for low MCS users (i.e., low data rate users) than for stations in high SNR conditions. Furthermore, it may be desirable to completely exclude low-SNR users from downlink multi user (MU)-MIMO communications.

Protocol Based on Channel Evolution Tracked by Stations

Figure 4:
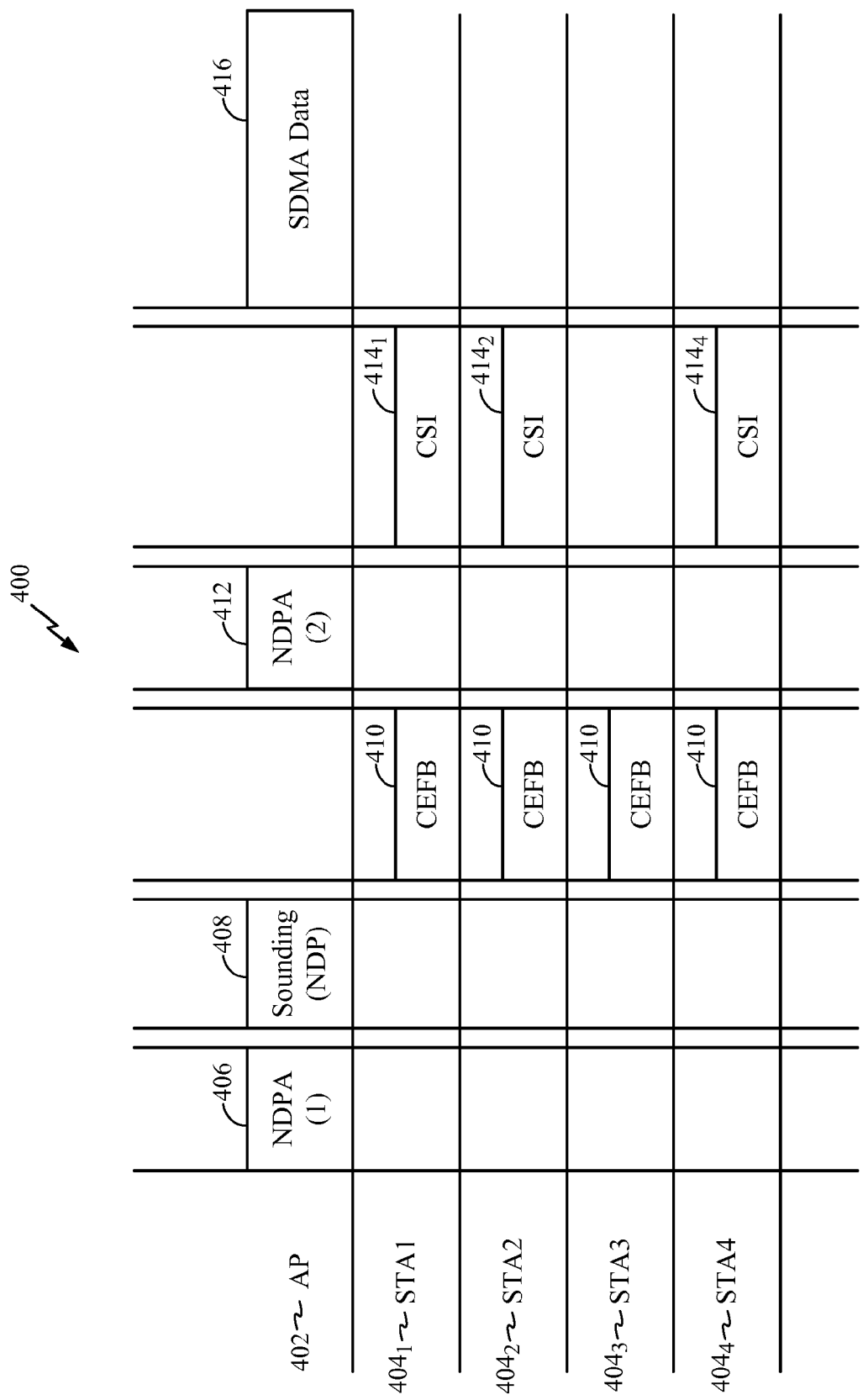
FIG. 4 illustrates an example Media Access Control (MAC) protocol relying on channel evolution tracking and feedback from user stations (STAs) in accordance with certain aspects of the present disclosure.

In one aspect of the present disclosure, each user station (STA) of a wireless system (e.g., each of the STAs 120 of the system 100 from FIG. 1) may track aging (evolution) of its own channel state, wherein the channel evolution may be represented by means of one or more metrics. FIG. 4 illustrates an example two-step Media Access Control (MAC) protocol 400 relying on channel evolution tracking by STAs in accordance with certain aspects of the present disclosure. An access point (AP) 402 may first request, via a message 406, channel evolution data from all STAs in the system or from a subset of STAs, such as STAs $404_1$, $404_2$, $404_3$, $404_4$ illustrated in FIG. 4 representing candidates for an impending downlink Spatial Division Multiple Access (SDMA) transmission. Following a Short Inter-Frame Space (SIFS) interval, the AP 402 may transmit a Null Data Packet (NDP) 408, which may comprise a Very High Throughput (VHT) preamble for downlink channel sounding. In an aspect, the message 406 may comprise a Null Data Packet Announcement (NDPA) transmitted in accordance with the IEEE 802.11 family of standards (e.g., IEEE 802.11ac wireless communications standard).

In response to the NDPA 406, each of the STAs $404_1$-$404_4$ may transmit to the AP 402 a channel evolution feedback (CEFB) message 410 comprising a channel evolution metric. Based on the received channel evolution metrics and one or more network status parameters (e.g., at least one of a total number of SDMA clients (STAs), a modulation-coding scheme (MCS) for each STA, or a transmit power for each STA), the AP 402 may transmit another NDPA message 412 requesting channel state information (CSI) feedback from a subset of STAs from whom the AP 402 has determined that CSI feedback is required. As illustrated in FIG. 4, the STAs $404_1$, $404_2$ and $404_4$ addressed in the NDPA 412 may respond to this request with their respective CSI feedback messages $414_1$, $414_2$ and $414_4$. After updating its precoding weights based on the received CSI feedback, the AP 402 may initiate transmission of downlink SDMA data 416.

Protocol Based on Channel Evolution Tracked by Access Point

Figure 5:
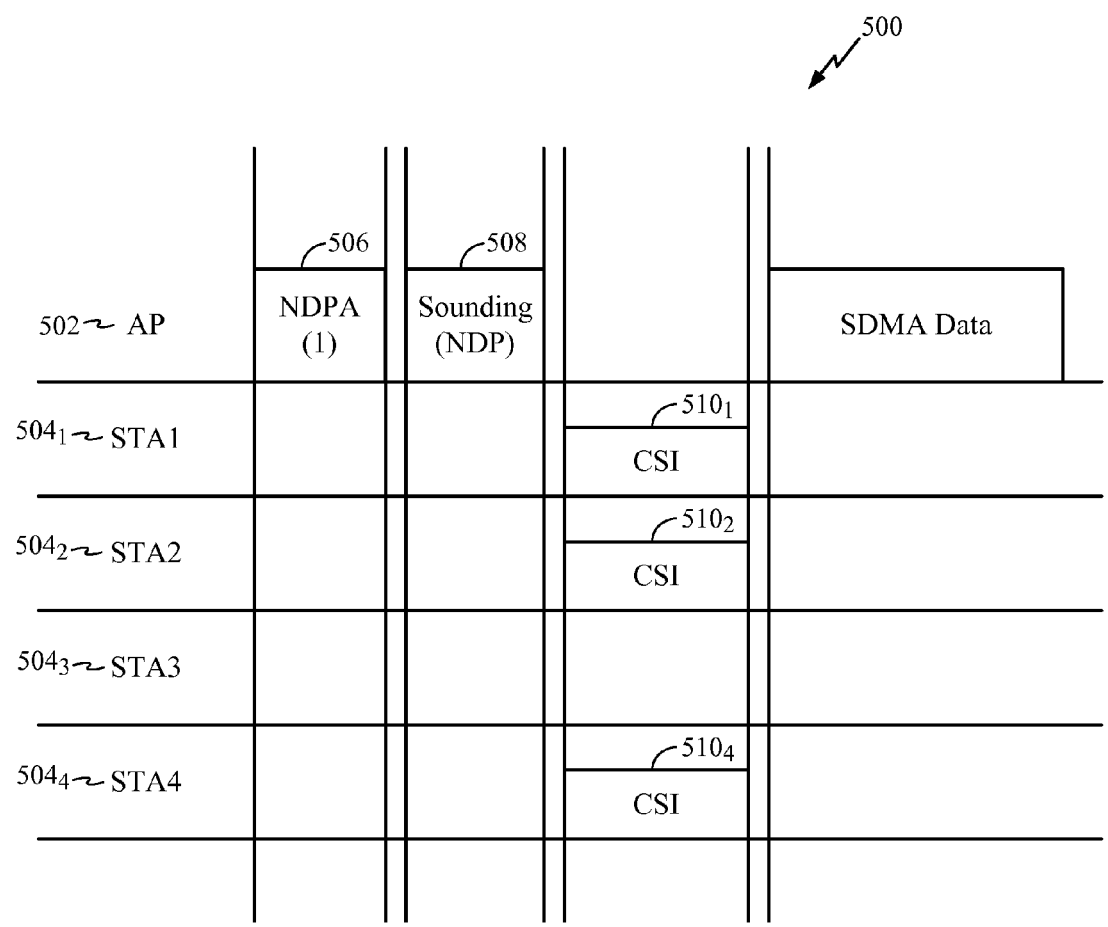
FIG. 5 illustrates an example MAC protocol relying on channel evolution tracked by an access point in accordance with certain aspects of the present disclosure.

In the proposed 400 from FIG. 4, the AP 402 may not be responsible for assessing and tracking CSI evolution for each STA. Instead, individual STAs may keep track of channel evolution over time. Alternatively, the AP may be responsible to calculate channel evolution metrics based on a history of CSI received from each STA. In an aspect of the present disclosure, the AP may periodically request CSI from a subset of STAs based on the calculated channel evolution metrics. FIG. 5 illustrates a MAC protocol 500 where channel evolution may be tracked by the AP.

As illustrated in FIG. 5, an AP 502 may initiate CSI feedback transactions by transmitting a request for CSI message 506. This request may be transmitted to STAs $504_1$, $504_2$, $504_3$, $504_4$ using, for example, a lowest rate legacy IEEE 802.11a/g format. In an aspect, the request for CSI 506 may comprise a broadcast Null Data Packet Announcement (NDPA) message in accordance with the IEEE 802.11 family of standards (e.g., IEEE 802.11ac wireless communications standard). The NDPA message 506 may serve two purposes: it requests periodically CSI data from a subset of STAs, and protects the CSI feedback transactions by setting their duration fields to cause all non-participating STAs to appropriately set their Network Allocation Vector (NAV) counters according to values in the duration fields. A payload of the NDPA 506 may comprise specific bits indicating that this message represents a request for CSI. After a SIFS interval following transmission of the NDPA 506, the AP 502 may transmit a sounding message 508 (i.e., a Null Data Packet (NDP)) comprising a Very High Throughput (VHT) preamble for downlink channel sounding. Unlike the NDPA 506, the NDP message 508 may not be legacy-decodable.

A subset of STAs addressed in each periodic NDPA transmitted from the AP may be chosen by the AP to achieve a particular rate of CSI feedback from each STA. Those STAs from which more frequent CSI updates are required (e.g., due to more dynamic channel conditions) may be addressed more frequently in periodically transmitted NDPA messages. The AP 502 may address, within the NDPA 506, the STAs 504₁, 504₂ and 504₄ to transmit their respective CSI feedback messages 510₁, 510₂ and 510₄, as illustrated in FIG. 5.

A rate at which the AP 502 requests CSI from a particular STA may depend on that STA's rate of channel evolution as assessed by metrics calculated by the AP 502. For each STA, the AP 502 may store CSI on which current SDMA beamforming weights were generated. Whenever fresh CSI is received from that STA (e.g., as a result of a periodic NDPA), the AP 502 may evaluate degree of evolution between the old and new channel states based on a defined metric.

If the evaluated degree of evolution exceeds a predetermined threshold level, then this may indicate that the rate of CSI feedback for that STA may be insufficient, and may implore the AP 502 to increase the rate of CSI requests for that STA. If the evaluated degree of evolution is smaller than a threshold level, then this may indicate that the rate of CSI feedback for the STA is excessive, and may implore the AP 502 to decrease the rate of CSI requests for the STA. The rate of CSI requests for a particular STA may also depend on at least one of a total number of SDMA clients (STAs), a utilized MCS for each client, or a transmit power for each client.

A step size by which the CSI request interval can be increased may be different from a step size by which the CSI request interval can be decreased. In one aspect of the present disclosure, a linear interval increase and an exponential interval decrease may be utilized. In another aspect of the present disclosure, different linear up and down step sizes may be applied. For certain aspects, the chosen step sizes may depend on a relative system performance penalty associated with insufficiently frequent CSI updates versus excessively frequent CSI updates.

It can be observed that the proposed protocol 500 illustrated in FIG. 5 may differ from the protocol 400 from FIG. 4 in several ways. First, channel evolution may be assessed by an AP rather than by individual STAs. Second, the AP may track per-STA channel evolution on the basis of history of CSI received from each STA rather than a channel evolution metric received from each STA. Third, the AP may need to request CSI periodically from each STA in order to assess channel evolution, although not necessarily at identical rates for all the STAs. Fourth, a subset of STAs addressed in each CSI request may be chosen to achieve a particular rate of CSI feedback from each STA over time. Fifth, the AP may modulate the rate of periodic CSI requests for each STA based on that STA's rate of channel evolution. Finally, the subset of STAs addressed in each CSI request may depend on an elapsed time period since the last CSI update from that STA.

In general, the aforementioned MAC protocol supports that an AP may be sending a CSI request periodically to a subset of STAs. The subset of STAs may be chosen on the basis of some metric calculated at the AP. The calculated metric may indicate a degree of channel evolution since the most recent CSI update.

Figure 6:
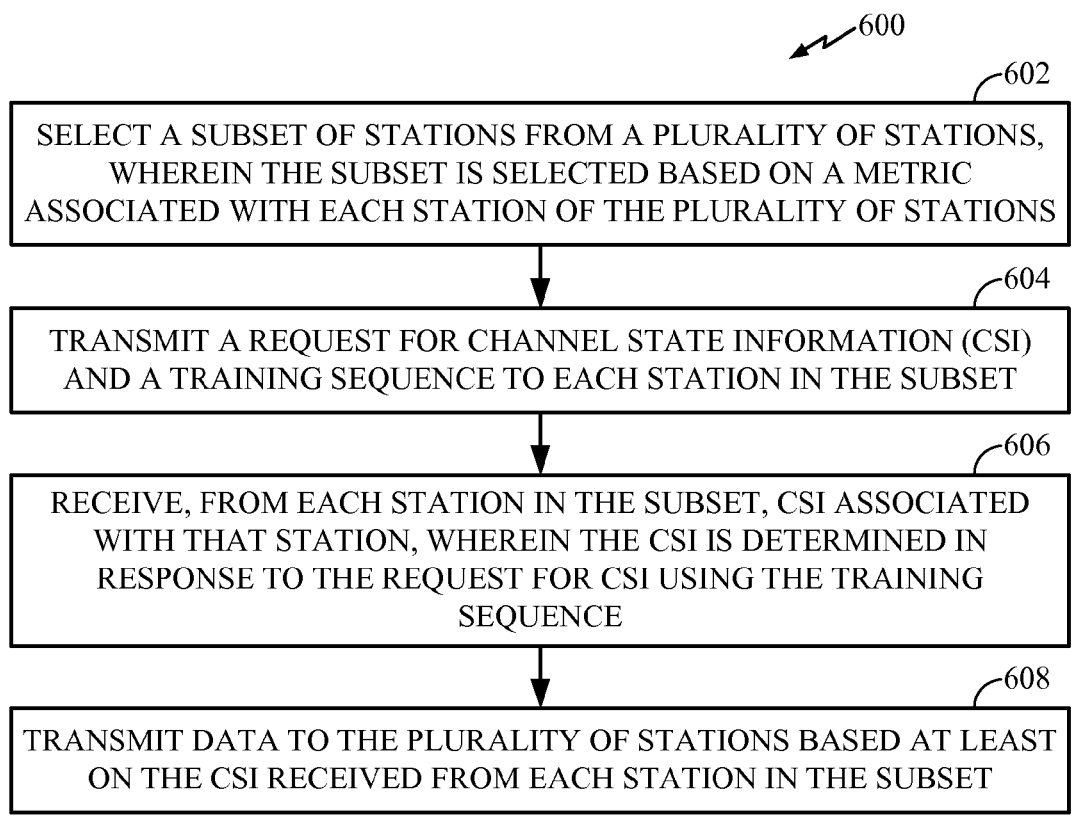
FIG. 6 illustrates example operations that may be performed at an access point for implementing a MAC protocol relying on channel evolution tracked by the access point in accordance with certain aspects of the present disclosure.
Figure 6A:
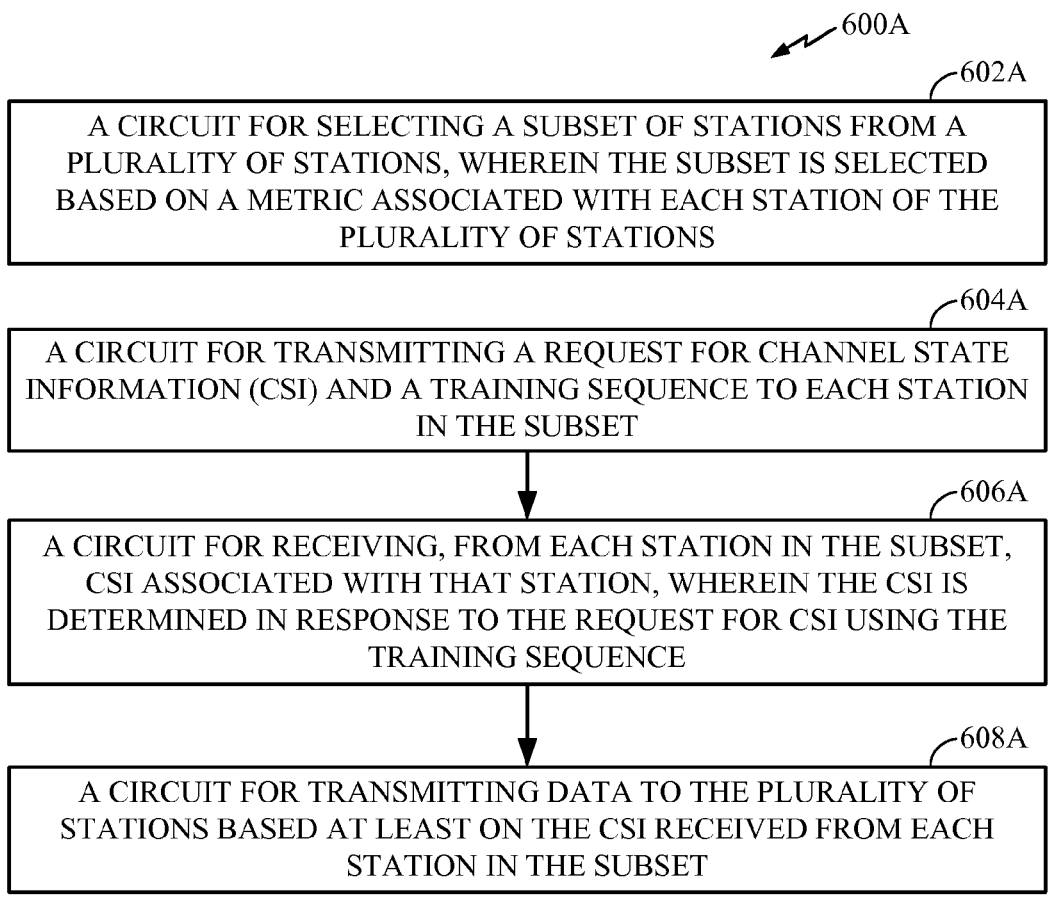
FIG. 6A illustrates example components capable of performing the operations illustrated in FIG. 6.

FIG. 6 illustrates example operations 600 that may be performed at an AP for implementing the proposed MAC protocol from FIG. 5 in accordance with certain aspects of the present disclosure. At 602, the AP may select a subset of STAs from a plurality of STAs, wherein the subset may be selected based at least on a metric associated with each STA of the plurality of STAs. At 604, the AP may transmit a request for CSI and a training sequence (e.g., a Null Data Packet (NDP)) to each STA in the subset. At 606, the STA may receive, from each STA in the subset, CSI associated with that STA, wherein the CSI may be determined in response to the request for CSI using the NDP. At 608, the AP may transmit data to the plurality of STAs based at least on the CSI received from each STA in the subset.

The training sequence may be decodable by those STAs capable of performing Spatial Division Multiple Access (SDMA). In an aspect, the request for CSI may comprise a broadcast NDPA message in accordance with the IEEE 802.11 family of standards (e.g., IEEE 802.11ac wireless communications standard), wherein the NDPA may be transmitted utilizing a rate supported by non-SDMA capable STAs. In another aspect, the request for CSI may protect transmission of the CSI by setting a duration field of the CSI causing another subset of the plurality of STAs to set their NAV counters according to the duration field.

In an aspect, the metric may be compared to one or more threshold values, and a rate of transmitting the request for CSI may be adjusted based on the comparison. The rate may be decreased, if a change of the CSI received from one of the STAs compared to another CSI previously received from that STA is within a limit. The rate may be increased, if the change of CSI is greater than the limit. In an aspect, the metric may comprise a rate of evolution of CSI of each of the plurality of STAs.

Figure 7:
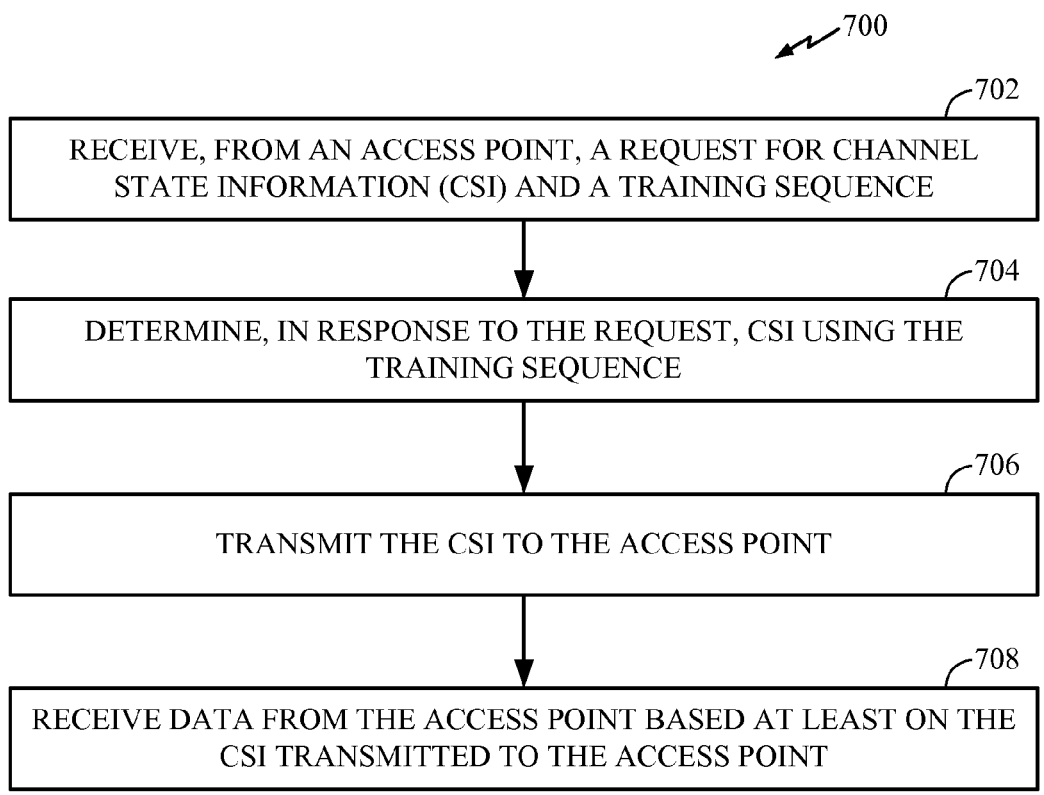
FIG. 7 illustrates example operations that may be performed at a STA for implementing a MAC protocol relying on channel evolution tracked by an access point serving the STA in accordance with certain aspects of the present disclosure.
Figure 7A:
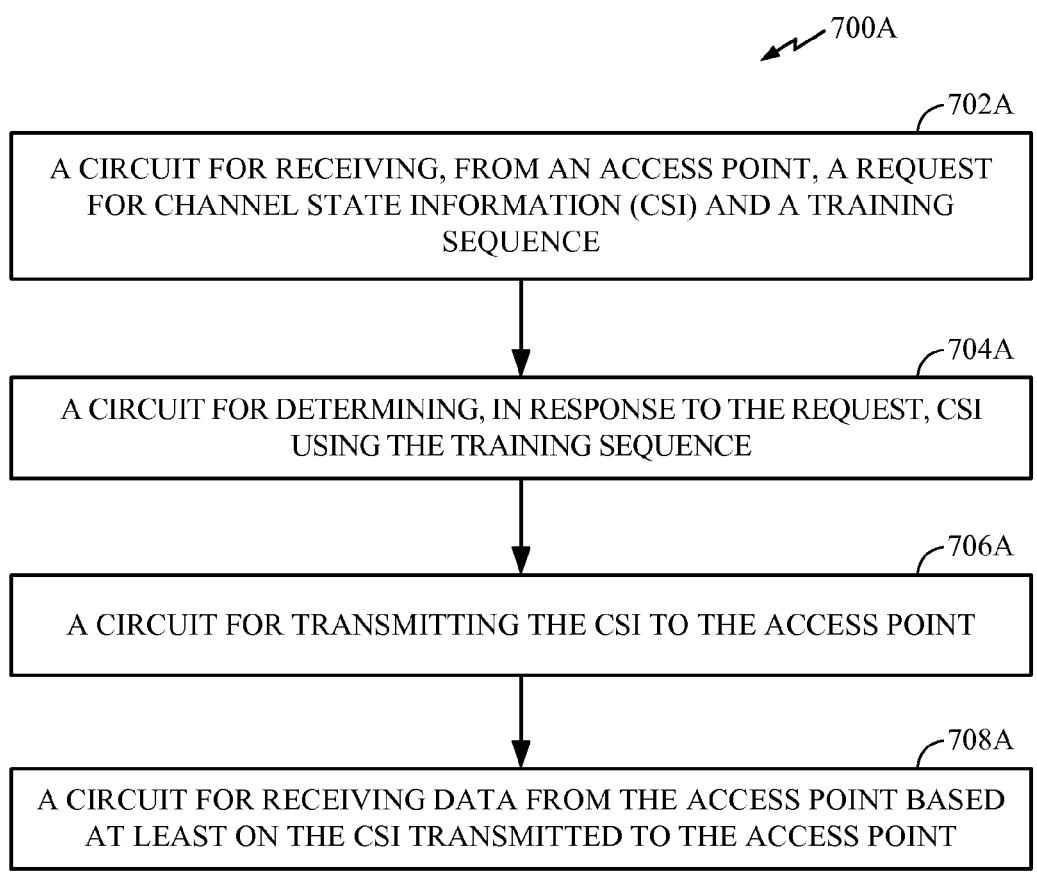
FIG. 7A illustrates example components capable of performing the operations illustrated in FIG. 7.

FIG. 7 illustrates example operations 700 that may be performed at a wireless node (e.g., at a STA) for implementing the proposed MAC protocol from FIG. 5 in accordance with certain aspects of the present disclosure. At 702, the STA may receive, from an AP, a request for CSI and a training sequence (e.g., a Null Data Packet (NDP)). At 704, in response to the request, the STA may determine CSI using the NDP. At 706, the STA may transmit the CSI to the AP, and, at 708, the STA may receive data from the AP based at least on the CSI transmitted to the AP. In an aspect, the AP may be utilizing Spatial Division Multiple Access (SDMA). In an aspect, the STA may be able to decode the training sequence, if the STA is capable of performing SDMA.

Channel Training Protocol with Sounding Frames and Explicit Channel State Information The proposed MAC protocol 500 illustrated in FIG. 5 seeks to minimize an uplink overhead by limiting a rate of CSI feedback to a minimum necessary to support accurate SDMA precoding. However, a full "explicit" CSI transmission may comprise, for example, several thousand bytes, and may be, therefore, an expensive means to assess channel evolution. Certain aspects of the present disclosure therefore exploit uplink channel sounding and the principle of channel reciprocity (i.e., implicit feedback) to provide an AP with channel evolution data from STAs with potentially less uplink overhead.

The AP may solicit either explicit or implicit CSI from the STAs. In the case of explicit CSI, the AP may transmit a training signal to the STAs. Based on the training signal, the STAs may estimate CSI for channels from the AP to the STAs, and transmit the CSI estimates to the AP in an uplink data transmission. This is the mechanism of CSI feedback utilized in the protocol 500 from FIG. 5. On the other hand, in the case of implicit CSI feedback, the AP may transmit a training request message to the STAs, and each STA may respond with a training (sounding) signal. After that, the AP may estimate CSI for channels from the STAs to the AP using the received training signals. Then, the AP may apply the channel reversibility principle in order to compute CSI for channels from the AP to the STAs.

In some environments, it may not be suitable to adapt the CSI feedback interval based on past measurements even though it may be desirable to minimize a rate of explicit CSI transmission from each STA in order to limit uplink overhead. To minimize the rate at which the explicit CSI is transmitted, the AP may be able to estimate the difference metric for the AP-to-STA (downlink) channel by using estimates of the STA-to-AP (uplink) channel.

In order to obtain this metric, the AP may compute the CSI for the STA-to-AP channel by using training fields present in unsolicited packets transmitted from the STA or by specifically soliciting training signals. One advantage of this approach can be that training signals may be transmitted in a much shorter time period than a time period required for data frames carrying explicit CSI. The AP may store past estimates of the CSI for the STA-to-AP channel and may compute the channel evolution metric between the current and past channel estimate. The computed channel evolution metric may be used to determine whether explicit CSI is required to be solicited.

Figure 8A:
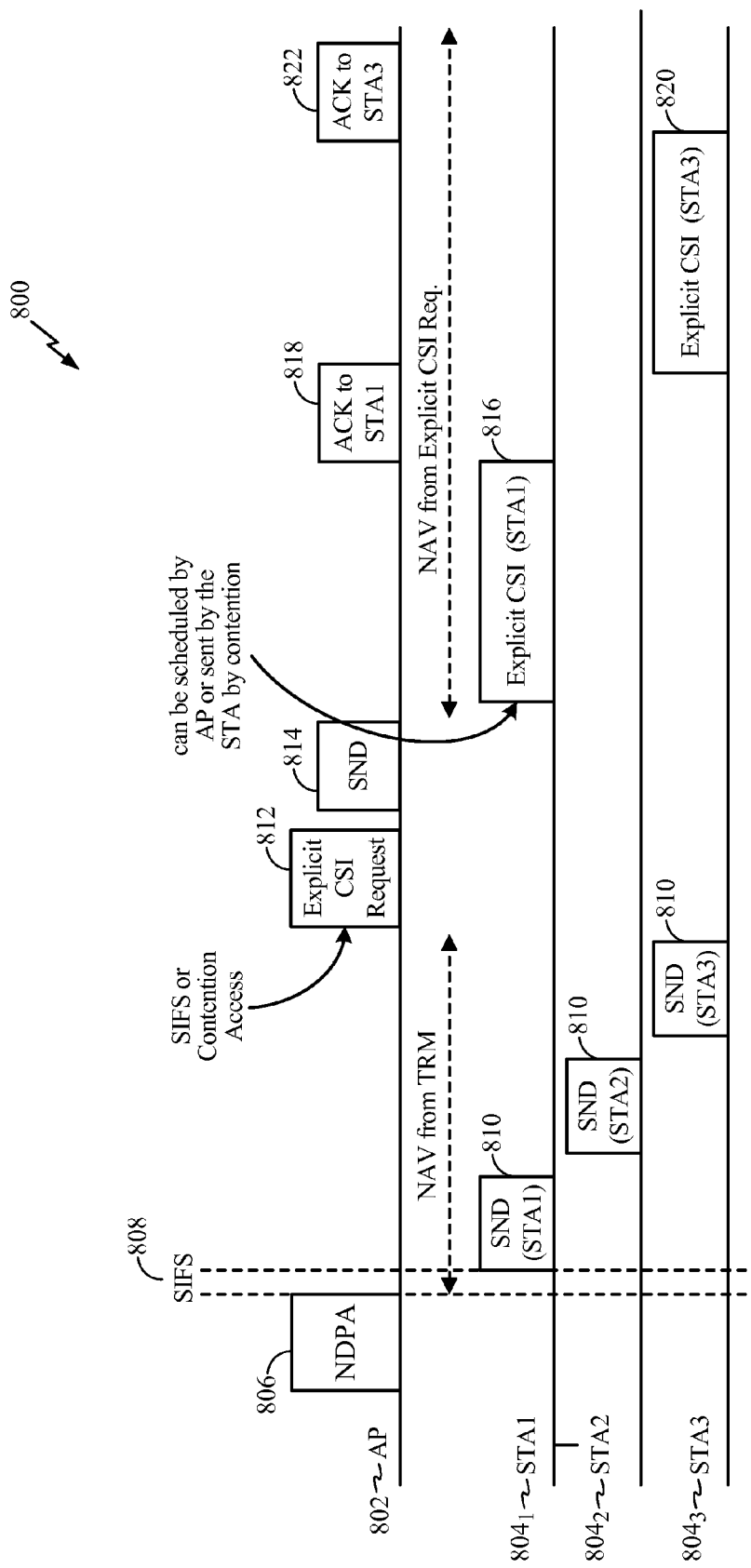
FIGS. 8A-8C illustrate examples of channel training protocols with sounding frames and explicit channel state information (CSI) in accordance with certain aspects of the present disclosure.

FIG. 8A illustrates a training protocol 800 that utilizes the aforementioned idea. An AP 802 may transmit a message 806 to STAs $804_1$, $804_2$, $804_3$ in order to request sounding frames from the selected STAs. In an aspect, the message 806 may comprise a Null Data Packet Announcement (NDPA) in accordance with the IEEE 802.11 family of standards (e.g., IEEE 802.11ac wireless communications standard). After a SIFS interval 808 following the transmission of NDPA 806, the STAs $804_1$, $804_2$, $804_3$ may respond with sounding frames 810 transmitted to the AP 802. In one aspect of the present disclosure, a deterministic back-off timer may be utilized to solicit sounding after the NDPA 806. Each of the sounding frames 810 may comprise a Null Data Packet (NDP) in accordance with the IEEE 802.11 family of standards (e.g., IEEE 802.11 ac wireless communications standard).

Based on the received sounding frames 810, the AP 802 may estimate channels from the selected STAs $804_1$, $804_2$, $804_3$, and may compare these new channel estimates with past channel estimates. In other words, the AP 802 may calculate a channel evolution metric based on the uplink channel sounding packets 810 requested by the AP. Based on the comparison of new and past channel estimates (i.e., on the channel evolution metric), the AP 802 may select a subset of the STAs $804_1$, $804_2$, $804_3$ for explicit CSI transmission with necessary sounding from all AP antennas. It should be noted that if the computation at the AP indicates that the channels for all the STAs specified in the NDPA 806 have not changed, the AP 802 may not transmit any explicit CSI request.

In one aspect of the present disclosure, an explicit CSI request 812 may be transmitted to the selected subset of STAs using the contention method. In another aspect, the explicit CSI request 812 may be transmitted using the Point coordination function Inter-Frame Space (PIFS) access method. In yet another aspect, the explicit CSI request 812 may be transmitted at SIFS interval after the last sounding frame 810 is being transmitted to the AP from one of the STAs $804_1$, $804_2$, $804_3$. In an aspect, the explicit CSI request message 812 may comprise a broadcast NDPA message in accordance with the IEEE 802.11 family of standards (e.g., IEEE 802.11 ac wireless communications standard).

Following the transmission of explicit CSI request 812, the AP 802 may transmit a sounding (training) frame 814 to the selected subset of STAs. In an aspect, the sounding frame 814 may comprise an NDP message in accordance with the IEEE 802.11 family of standards (e.g., IEEE 802.11ac wireless communications standard). As illustrated in FIG. 8A, the subset of STAs selected for explicit CSI transmission may comprise the STAs $804_1$ and $804_3$. Based on the received sounding frame 814, the STA $804_1$ may estimate its corresponding STA-to-AP channel and transmit an explicit CSI message 816 to the AP 802. Once the explicit CSI 816 is successfully received, the AP 802 may transmit an acknowledgement (ACK) message 818 to the STA $804_1$. Similarly, the STA $804_3$ may estimate, based on the received sounding frame 814, its STA-to-AP channel and transmit explicit CSI message 820 to the AP 802. Once the explicit CSI 820 is successfully received, the AP 802 may transmit an ACK message 822 to the STA $804_3$.

In one aspect of the present disclosure, the explicit CSI messages 816, 820 may be transmitted from the STAs $804_1$, $804_3$ using the deterministic backoff scheduled by the AP 802. In another aspect, the explicit CSI messages 816 and 820 may be transmitted based on the contention of STAs $804_1$, $804_3$. The explicit CSI request message 812 may comprise a serial number of the request. Then, each of the explicit CSI messages transmitted by one of the STAs may comprise a serial number of a request for channel measurement to which that explicit CSI message corresponds.

Figure 8B:
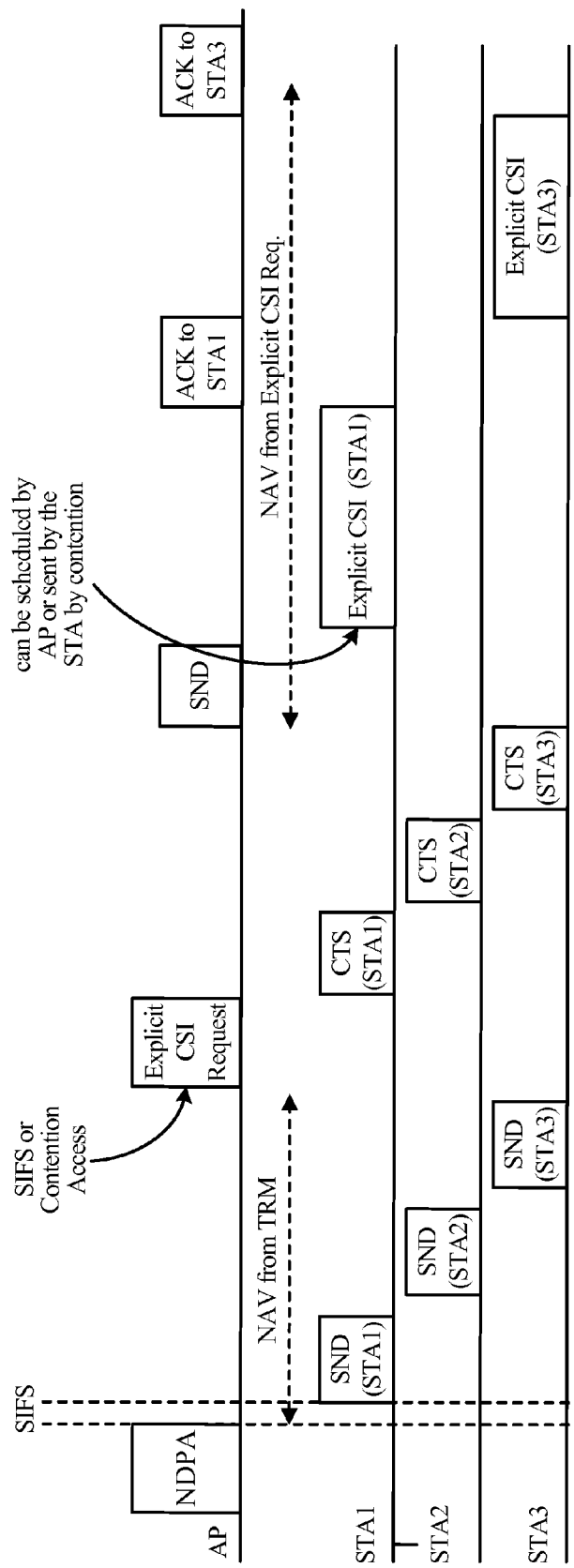

Certain aspects of the present disclosure support that the transmission of sounding frame 814 from the AP 802 may be preceded by a clear-to-send (CTS) message transmitted from each STA. This may provide the STAs with a clear medium for reception of the sounding frame 814 transmitted from the AP 802, which may be required for accurate channel estimation at the STAs. In one aspect of the present disclosure, the CTS may be transmitted in a serial manner from each STA, as illustrated in FIG. 8B. In another aspect, the CTS may be transmitted simultaneously from each STA (i.e., CTS messages may be stacked), as illustrated in FIG. 8C.

It should be also noted that the AP's decision to request CSI feedback from a particular STA may depend on combination of different information, wherein the combination may comprise at least one of: channel evolution metrics received from a plurality of STAs, channel evolution metrics for the plurality of STAs calculated by the AP, signal-to-noise ratio (SNR) conditions of the plurality of STAs, an anticipated data rate (modulation-coding scheme) supported by each of the plurality of STAs, an overall interference level anticipated for the next SDMA transmission, or known receiving capability (e.g., support for interference cancellation) of one or more of the STAs.

Figure 8C:
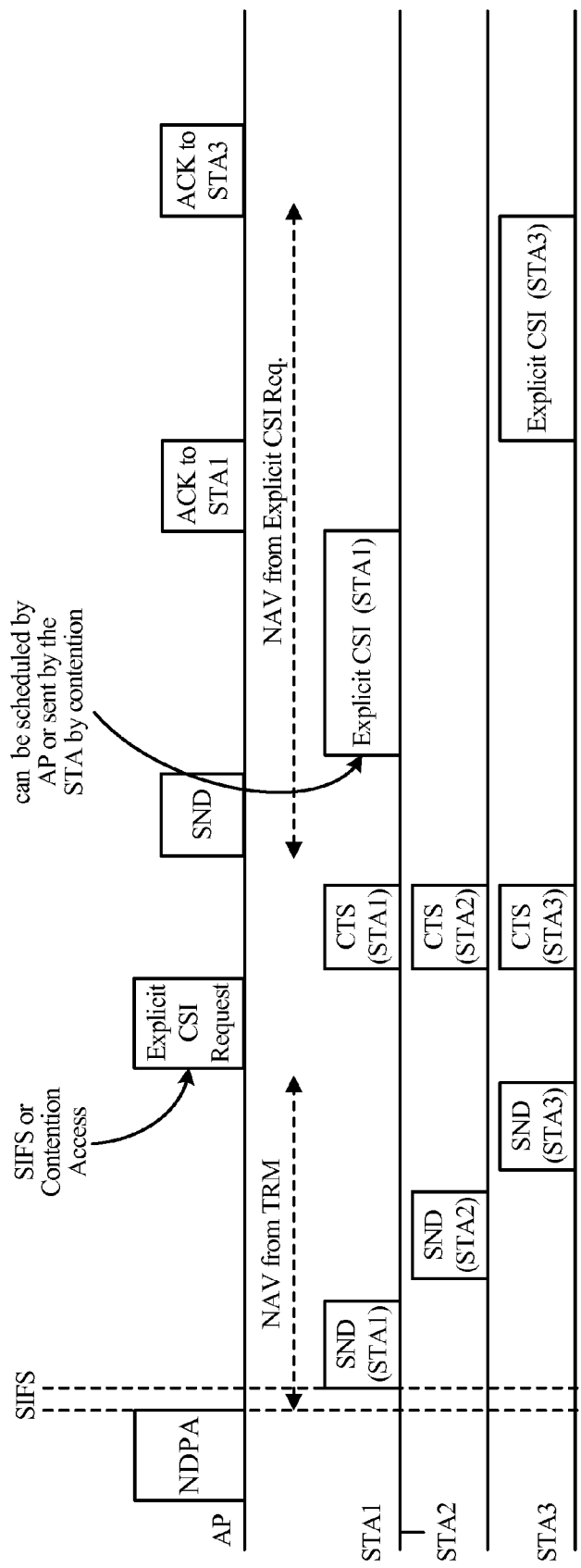
Figure 9:
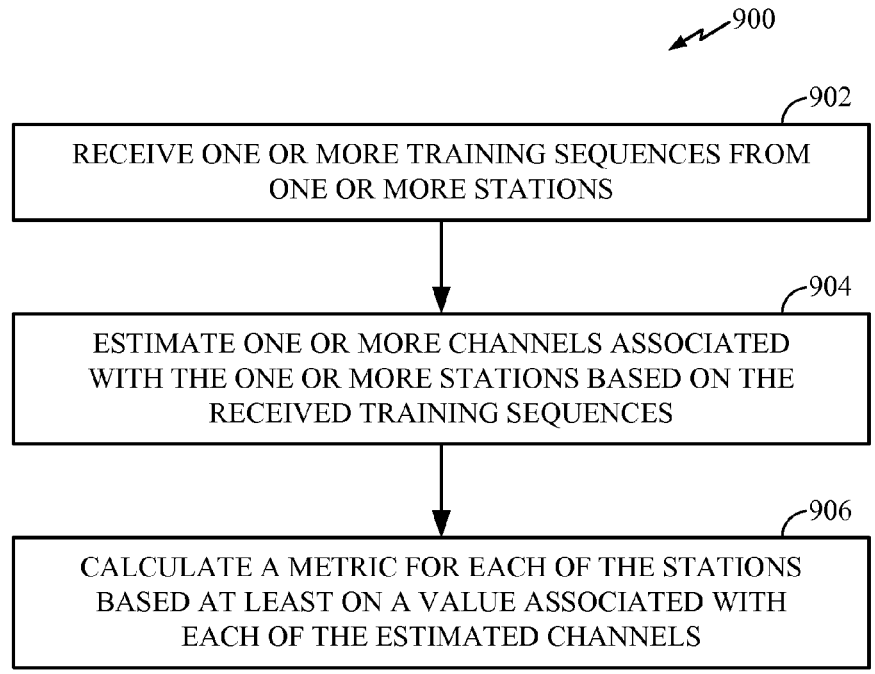
FIG. 9 illustrates example operations that may be performed at an access point for implementing a training protocol utilizing sounding frames and explicit CSI in accordance with certain aspects of the present disclosure.
Figure 9A:
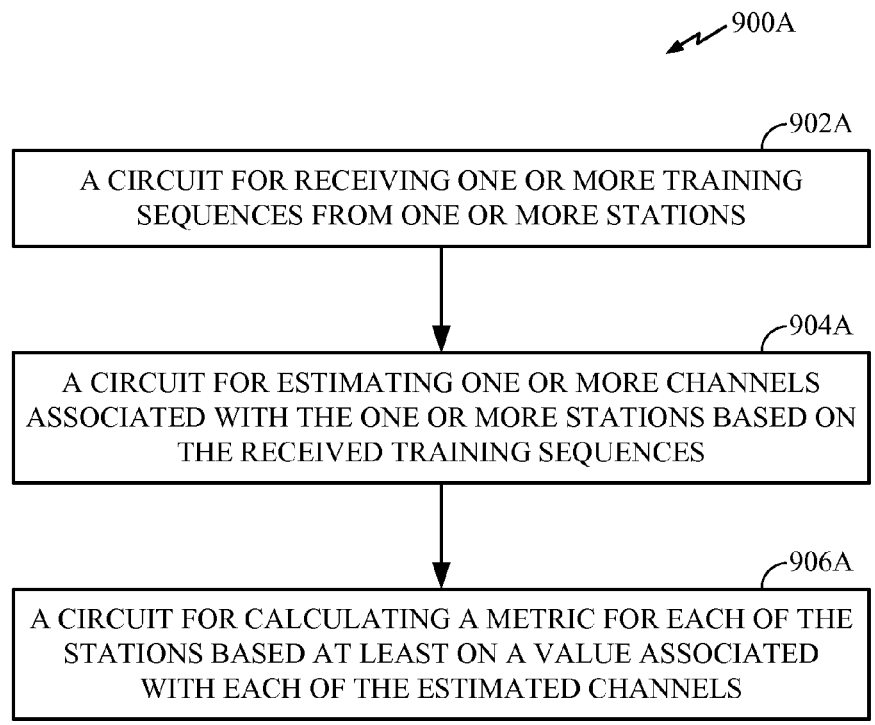
FIG. 9A illustrates example components capable of performing the operations illustrated in FIG. 9.

FIG. 9 illustrates example operations 900 that may be performed at an AP for implementing the training protocol illustrated in FIGS. 8A-8C that utilizes sounding frames and explicit CSI in accordance with certain aspects of the present disclosure. At 902, the AP may receive one or more training sequences (i.e., Null Data Packets (NDPs)) from one or more STAs. At 904, the AP may estimate one or more channels associated with the one or more STAs based on the received one or more NDPs. At 906, the AP may calculate a metric for each of the STAs based at least on a value associated with each of the estimated channels. In an aspect, the metric calculation for each STA may comprise comparing the value with another previously obtained value associated with that same estimated channel to evaluate channel evolution. The estimated channel evolution may be then utilized to determine if CSI should be requested from that STA.

Each of the received training sequences may comprise an NDP in accordance with the IEEE 802.11 family of standards. In an aspect, the NDP may comprise at least one of High Throughput Long Training Fields (HT-LTFs) or Very High Throughput Long Training Fields (VHT-LTFs), wherein the one or more channels may be estimated using the at least one of HT-LTFs or VHT-LTFs. The NDP and the request for CSI may be included into a single physical layer frame.

In an aspect, the metric may comprises a rate of evolution of CSI associated with one of the STAs. The rate of evolution may be calculated based at least in part on a most recently received CSI value and a previously received CSI value associated with that STA.

In an aspect, the AP may receive one or more clear-to-send (CTS) messages from a subset of the STAs. The CTS messages may be transmitted in order to protect transmission of a training signal from the AP to the STAs in the subset.

Figure 10:
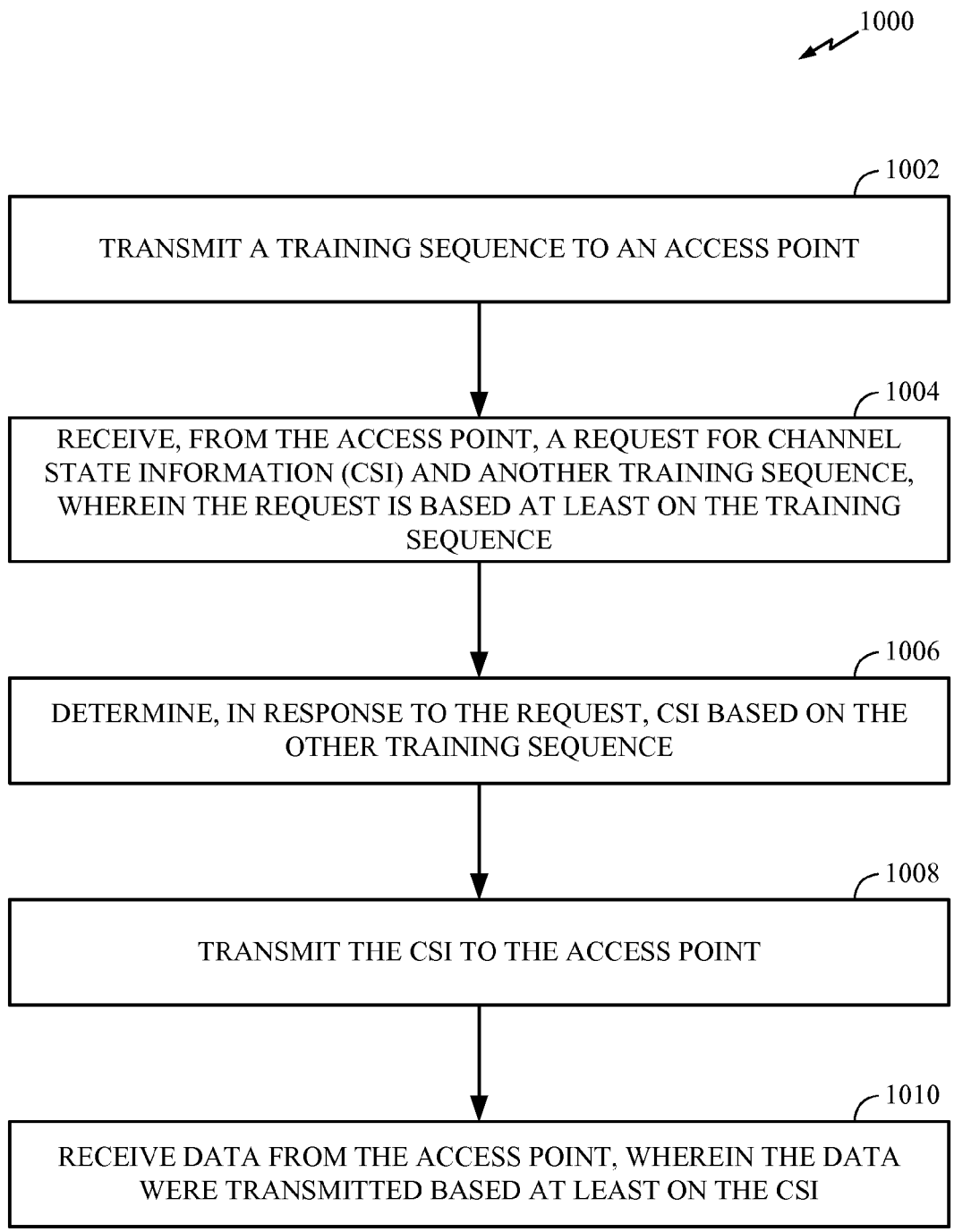
FIG. 10 illustrates example operations that may be performed at a STA for implementing a training protocol utilizing sounding frames and explicit CSI in accordance with certain aspects of the present disclosure.
Figure 10A:
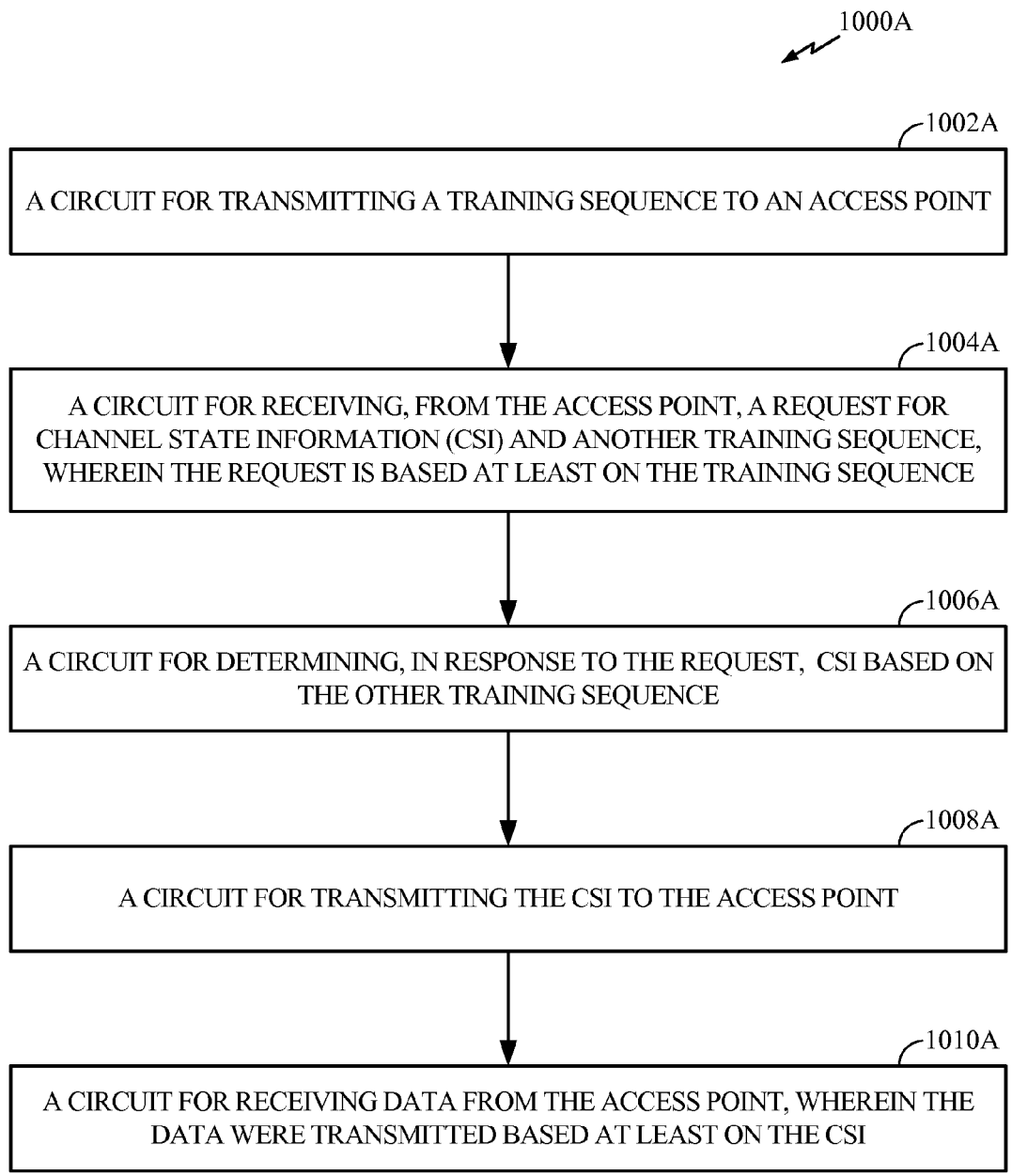
FIG. 10A illustrates example components capable of performing the operations illustrated in FIG. 10.

FIG. 10 illustrates example operations 1000 that may be performed at a wireless node (e.g., at a STA) for implementing the training protocol illustrated in FIGS. 8A-8C that utilizes sounding frames and explicit CSI in accordance with certain aspects of the present disclosure. At 1002, the STA may transmit a training sequence (i.e., a first NDP message) to an AP. At 1004, the STA may receive, from the AP, a request for CSI and another training sequence (i.e., a second NDP message), wherein the request may be based at least on the first NDP. At 1006, in response to the request, the STA may determine CSI based on the second NDP. At 1008, the STA may transmit the CSI to the AP to reserve a channel for transmission of the other training sequence. At 1010, the STA may receive data from the AP, wherein the data may be transmitted based at least on the CSI. In an aspect, the request for CSI may comprise a Null Data Packet Announcement in accordance with the IEEE 802.11 family of standards (e.g., IEEE 802.11 ac wireless communications standard).

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600, 700, 900 and 1000 illustrated in FIGS. 6, 7, 9, and 10 correspond to components 600A, 700A, 900A and 1000A illustrated in FIGS. 6A, 7A, 9A, and 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for transmitting may comprise a transmitter, e.g., the transmitter 222 from FIG. 2 of the access point 110, the transmitter 254 from FIG. 2 of the user terminal 120, or the transmitter 310 from FIG. 3 of the wireless device 302. The means for receiving may comprise a receiver, e.g., the receiver 222 from FIG. 2 of the access point 110, the receiver 254 from FIG. 2 of the user terminal 120, or the receiver 312 from FIG. 3 of the wireless device 302. The means for selecting may comprise an application specific integrated circuit, e.g., a scheduler 234 from FIG. 2 of the access point 110 or the processor 304 from FIG. 3 of the wireless device 302. The means for estimating may comprise an estimator, e.g., the estimator 228 from FIG. 2 of the access point 110 or the estimator 278 from FIG. 2 of the user terminal 120. The means for comparing may comprise a comparator circuit, e.g., the processor 210 from FIG. 2 of the access point 110, the processor 242 from FIG. 2 of the user terminal 120, or the processor 304 from FIG. 3 of the wireless device 302. The means for adjusting may comprise an application specific integrated circuit, e.g., the processor 210 from FIG. 2 of the access point 110 or the processor 304 from FIG. 3 of the wireless device 302. The means for decreasing may comprise an application specific integrated circuit, e.g., the processor 210 from FIG. 2 of the access point 110 or the processor 304 from FIG. 3 of the wireless device 302. The means for increasing may comprise an application specific integrated circuit, e.g., the processor 210 from FIG. 2 of the access point 110 or the processor 304 from FIG. 3 of the wireless device 302. The means for determining may comprise an application specific integrated circuit, e.g., the processor 270 from FIG. 2 of the user terminal 120 or the processor 304 from FIG. 3 of the wireless device 302. The means for setting may comprise an application specific integrated circuit, e.g., the processor 270 from FIG. 2 of the user terminal 120, the processor 288 from FIG. 2 of the user terminal 120, or the processor 304 from FIG. 3 of the wireless device 302. The means for decoding may comprise a decoder, e.g., the processor 270 from FIG. 2 of the user terminal 120 or the processor 304 from FIG. 3 of the wireless device 302. The means for calculating may comprise an application specific integrated circuit, e.g., the processor 210 from FIG. 2 of the access point 110, the processor 242 from FIG. 2 of the user terminal 120, or the processor 304 from FIG. 3 of the wireless device 302. The means for utilizing may comprise an application specific integrated circuit, e.g., the processor 210 from FIG. 2 of the access point 110, the processor 242 from FIG. 2 of the user terminal 120, or the processor 304 from FIG. 3 of the wireless device 302.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
    selecting, at a first apparatus, a subset of apparatuses from a plurality of apparatuses, wherein the subset is selected based at least on a metric associated with each apparatus of the plurality of apparatuses, wherein the metric comprises a rate of evolution of channel state information (CSI) of each of the plurality of apparatuses and wherein the metric is determined based at least on one of:
        a total number of apparatuses in the plurality of apparatuses,
        a modulation-coding scheme (MCS) associated with each of the plurality of apparatuses, or
        a transmit power associated with each of the plurality of apparatuses;
    transmitting a request for CSI and a training sequence to each apparatus in the subset;
    receiving, from each apparatus in the subset, CSI associated with that apparatus, wherein the CSI is determined in response to the request for CSI using the training sequence; and
    transmitting data to the plurality of apparatuses based at least on the CSI received from each apparatus in the subset.

2. The method of claim 1, wherein the metric is calculated by the first apparatus.

3. The method of claim 1, wherein the data are transmitted utilizing Spatial Division Multiple Access (SDMA).

4. The method of claim 1, further comprising:
    estimating a channel between each of the apparatuses in the subset and the first apparatus using the CSI received from that apparatus in the subset.

5. The method of claim 1, further comprising:
    comparing the metric to one or more threshold values; and
    adjusting a rate of transmitting the request for CSI based on the comparison.

6. The method of claim 5, wherein the adjusting comprises:
    decreasing the rate, if a change of the CSI received from one of the apparatuses compared to another CSI previously received from that apparatus is within a limit; and
    increasing the rate, if the change of CSI is greater than the limit.

7. The method of claim 1, wherein:
the request for CSI comprises a Null Data Packet Announcement (NDPA) in accordance with the IEEE 802.11 family of standards,
the NDPA is transmitted utilizing a rate supported by non-SDMA capable apparatuses, and
the NDPA requests the CSI from each apparatus in the subset.

8. The method of claim 1, wherein the request for CSI protects transmission of the CSI by setting a duration field of the CSI causing another subset of the plurality of apparatuses to set their network allocation vector (NAV) counters according to the duration field.

9. The method of claim 1, wherein:
the training sequence comprises a Null Data Packet (NDP) in accordance with the IEEE 802.11 family of standards, and
the NDP comprises a Very High Throughput (VHT) preamble for channel sounding.

10. The method of claim 1, wherein the training sequence is decodable by apparatuses capable of performing Spatial Division Multiple Access (SDMA).

11. An apparatus for wireless communications, comprising:
a first circuit configured to select a subset of apparatuses from a plurality of apparatuses, wherein the subset is selected based at least on a metric associated with each apparatus of the plurality of apparatuses, wherein the metric comprises a rate of evolution of channel state information (CSI) of each of the plurality of apparatuses and wherein the metric is determined based at least on one of:
a total number of apparatuses in the plurality of apparatuses,
a modulation-coding scheme (MCS) associated with each of the plurality of apparatuses, or
a transmit power associated with each of the plurality of apparatuses;
a transmitter configured to transmit a request for CSI and a training sequence to each apparatus in the subset; and
a receiver configured to receive, from each apparatus in the subset, CSI associated with that apparatus, wherein the CSI is determined in response to the request for CSI using the training sequence, wherein
the transmitter is also configured to transmit data to the plurality of apparatuses based at least on the CSI received from each apparatus in the subset.

12. The apparatus of claim 11, further comprising:
a circuit configured to calculate the metric.

13. The apparatus of claim 11, wherein the data are transmitted utilizing Spatial Division Multiple Access (SDMA).

14. The apparatus of claim 11, further comprising:
an estimator configured to estimate a channel between each of the apparatuses in the subset and the apparatus using the CSI received from that apparatus in the subset.

15. The apparatus of claim 11, further comprising:
a comparator configured to compare the metric to one or more threshold values; and
a circuit configured to adjust a rate of transmitting the request for CSI based on the comparison.

16. The apparatus of claim 15, wherein the circuit is also configured to:
decrease the rate, if a change of the CSI received from one of the apparatuses compared to another CSI previously received from that apparatus is within a limit; and
increase the rate, if the change of CSI is greater than the limit.

17. The apparatus of claim 11, wherein:
the request for CSI comprises a Null Data Packet Announcement (NDPA) in accordance with the IEEE 802.11 family of standards,
the NDPA is transmitted utilizing a rate supported by non-SDMA capable apparatuses, and
the NDPA requests the CSI from each apparatus in the subset.

18. The apparatus of claim 11, wherein the request for CSI protects transmission of the CSI by setting a duration field of the CSI causing another subset of the plurality of apparatuses to set their network allocation vector (NAV) counters according to the duration field.

19. The apparatus of claim 11, wherein:
the training sequence comprises a Null Data Packet (NDP) in accordance with the IEEE 802.11 family of standards, and
the NDP comprises a Very High Throughput (VHT) preamble for channel sounding.

20. The apparatus of claim 11, wherein the training sequence is decodable by apparatuses capable of performing Spatial Division Multiple Access (SDMA).

21. An apparatus for wireless communications, comprising:
means for selecting a subset of apparatuses from a plurality of apparatuses, wherein the subset is selected based at least on a metric associated with each apparatus of the plurality of apparatuses, wherein the metric comprises a rate of evolution of channel state information (CSI) of each of the plurality of apparatuses and wherein the metric is determined based at least on one of:
a total number of apparatuses in the plurality of apparatuses,
a modulation-coding scheme (MCS) associated with each of the plurality of apparatuses, or
a transmit power associated with each of the plurality of apparatuses;
means for transmitting a request for CSI and a training sequence to each apparatus in the subset; and
means for receiving, from each apparatus in the subset, CSI associated with that apparatus, wherein the CSI is determined in response to the request for CSI using the training sequence, wherein
the means for transmitting is further configured to transmit data to the plurality of apparatuses based at least on the CSI received from each apparatus in the subset.

22. The apparatus of claim 21, further comprising means for calculating the metric.

23. The apparatus of claim 21, wherein the data are transmitted utilizing Spatial Division Multiple Access (SDMA).

24. The apparatus of claim 21, further comprising:
means for estimating a channel between each of the apparatuses in the subset and the apparatus using the CSI received from that apparatus in the subset.

25. The apparatus of claim 21, further comprising:
means for comparing the metric to one or more threshold values; and
means for adjusting a rate of transmitting the request for CSI based on the comparison.

26. The apparatus of claim 25, wherein the means for adjusting comprises:
means for decreasing the rate, if a change of the CSI received from one of the apparatuses compared to another CSI previously received from that apparatus is within a limit; and
means for increasing the rate, if the change of CSI is greater than the limit.

27. The apparatus of claim 21, wherein:
the request for CSI comprises a Null Data Packet Announcement (NDPA) in accordance with the IEEE 802.11 family of standards,
the NDPA is transmitted utilizing a rate supported by non-SDMA capable apparatuses, and
the NDPA requests the CSI from each apparatus in the subset.

28. The apparatus of claim 21, wherein the request for CSI protects transmission of the CSI by setting a duration field of the CSI causing another subset of the plurality of apparatuses to set their network allocation vector (NAV) counters according to the duration field.

29. The apparatus of claim 21, wherein:
the training sequence comprises a Null Data Packet (NDP) in accordance with the IEEE 802.11 family of standards, and
the NDP comprises a Very High Throughput (VHT) preamble for channel sounding.

30. The apparatus of claim 11, wherein the training sequence is decodable by apparatuses capable of performing Spatial Division Multiple Access (SDMA).

31. A computer-program product for wireless communications, comprising a non-transitory computer-readable medium comprising instructions executable to:
select a subset of apparatuses from a plurality of apparatuses, wherein the subset is selected based at least on a metric associated with each apparatus of the plurality of apparatuses, wherein the metric comprises a rate of evolution of channel state information (CSI) of each of the plurality of apparatuses and wherein the metric is determined based at least on one of:
a total number of apparatuses in the plurality of apparatuses,
a modulation-coding scheme (MCS) associated with each of the plurality of apparatuses, or
a transmit power associated with each of the plurality of apparatuses;
transmit a request for CSI and a training sequence to each apparatus in the subset;
receive, from each apparatus in the subset, CSI associated with that apparatus, wherein the CSI is determined in response to the request for CSI using the training sequence; and
transmit data to the plurality of apparatuses based at least on the CSI received from each apparatus in the subset.

32. An access point, comprising:
at least one antenna;
a first circuit configured to select a subset of wireless nodes from a plurality of wireless nodes, wherein the subset is selected based at least on a metric associated with each wireless node of the plurality of wireless nodes, wherein the metric comprises a rate of evolution of channel state information (CSI) of each of the plurality of apparatuses and wherein the metric is determined based at least on one of:
a total number of apparatuses in the plurality of apparatuses,
a modulation-coding scheme (MCS) associated with each of the plurality of apparatuses, or
a transmit power associated with each of the plurality of apparatuses;
a transmitter configured to transmit via the at least one antenna a request for CSI and a training sequence to each wireless node in the subset; and
a receiver configured to receive, from each wireless node in the subset via the at least one antenna, CSI associated with that wireless node, wherein the CSI is determined in response to the request for CSI using the training sequence, wherein
the transmitter is also configured to transmit data via the at least one antenna to the plurality of wireless nodes based at least on the CSI received from each wireless node in the subset.

* * * * *